United States Patent
Greenspan et al.

[15] 3,678,277
[45] July 18, 1972

[54] APPARATUS FOR PROVIDING RECORDED CHROMATIC DATA DISPLAYS OF VARYING SENSOR SIGNALS

[72] Inventors: Gilbert Greenspan, 2027 Willow Street; Lawrence R. Curtis, 2727 De Anza Road, both of San Diego, Calif. 92106; Elmer E. Cunningham, 8051 Sterling Drive, El Cajon, Calif. 92021; James G. Tabler, 2060 Chicago, San Diego, Calif. 92106

[22] Filed: June 27, 1968

[21] Appl. No.: 740,640

[52] U.S. Cl.......................250/83.3 R, 250/71.5 S, 250/226
[51] Int. Cl.........................................................G01t 1/16
[58] Field of Search...................128/2; 250/71.5 S, 71.5, 65, 250/83.3 R, 226

[56] References Cited

UNITED STATES PATENTS

| | | | |
|---|---|---|---|
| 3,004,101 | 10/1961 | Jacobs et al. | 250/65 UX |
| 3,057,998 | 10/1962 | West | 250/71.5 X |
| 3,070,695 | 12/1962 | Stickney et al. | 250/71.5 |
| 3,114,833 | 12/1963 | Fine | 250/65 |
| 3,116,416 | 12/1963 | Reed | 250/71.5 X |
| 3,322,954 | 5/1967 | Bell et al. | 250/71.5 X |
| 3,549,887 | 12/1970 | Hansen | 250/71 X |

Primary Examiner—James W. Lawrence
Assistant Examiner—Davis L. Willis
Attorney—Carl R. Brown

[57] ABSTRACT

A chromatic data display system for recording signals from any source on color paper, and particularly for recording varying pulse rate information on color paper that is representative of the distribution of radioactive material in, for example, a part of a human body, which pulse rate information is in response to rectilinear scanning of that part of the human body or from the rescan of an image from a black and white photoscan on X-ray or other film, and which image represents pulse rate information obtained from prior rectilinear scannings.

5 Claims, 9 Drawing Figures

INVENTOR.
GILBERT (NMI) GREENSPAN
LAWRENCE R. CURTIS
ELMER E. CUNNINGHAM
JAMES G. TABLER

BY Carl R. Brown
ATTORNEY

*INVENTOR.*
GILBERT (NMI) GREENSPAN
LAWRENCE R. CURTIS
BY ELMER E. CUNNINGHAM
JAMES G. TABLER

ATTORNEY

PATENTED JUL 18 1972

INVENTOR.
GILBERT (NMI) GREENSPAN
LAWRENCE R. CURTIS
BY ELMER E. CUNNINGHAM
JAMES G. TABLER

Carl R. Brown
ATTORNEY

*INVENTOR.*
GILBERT (NMI) GREENSPAN
LAWRENCE R. CURTIS
BY ELMER E. CUNNINGHAM
JAMES G. TABLER

*ATTORNEY*

3,678,277

APPARATUS FOR PROVIDING RECORDED CHROMATIC DATA DISPLAYS OF VARYING SENSOR SIGNALS

BACKGROUND OF THE INVENTION

There are known rectilinear scanning devices, as well as motionless "cameras" that provide "self-illuminated" organ visualization. These devices detect radioactive material distribution, such as radio isotopes that have been introduced into the body from which the organ visualization is made. These devices provide a black and white image on film or paper of the organ examined from the radioactive material distribution in the organ. These nuclear medical detecting systems are basically collectors of statistical information that must be translated into some type of readable language. Preferably the language should not be difficult to interpret, and should be readily understood by the non-specialist in the field so that the information can best be employed.

The earliest attempts at organ visualization involved the plotting of numerical values on a grid, which plotted information suggested the size and shape of the organ studied. Later, tapping devices were developed that produced marks such as short vertical marks, crescents, asterisks or the like on various kinds of paper. The marks were also made by a stylus on teledeltos paper. The speed of the tapping devices limited their usefulness, and alternative methods of data recording were sought. With the development of photoscanning, data presentation was greatly improved, especially in studies where high count rates were desired. However, in studies where the target to non-target radioactive material distribution ratio is low, or stated another way where the differential in radiation from the radio isotopes is low, some type of contrast enhancement is needed in the display produced by the photoscanning equipment. The usual form of contrast enhancement utilized background suppress. In some instances, varying percentages of the total count rate were suppressed. The specific areas of interest can then be seen more clearly, but at the price of wiping out other information. Loss of any information in a complex diagnostic study is undesirable, and thus many have felt that adequate contrast enhancement achieved by sacrificing information is an incorrect and undesirable approach to the problem.

Recognizing the vast capabilities of the human eye in appreciating color changes, attempts have been made to display the data accumulated by a variety of color methods. Multicolored ribbons have been applied to the tapping devices, and several types of color wheels operated by a servo-mechanism and using various light sources have been developed However at the present time these methods are not readily adaptable to rectilinear scanners, nor to the cameras. In addition, the record produced by the color devices are normally limited to the size of Polacolor prints. A color television readout system has been developed, but there has been little success in photographing the face of the color television tube so that a copy of the "color scan" could be employed by others not viewing the color television tube.

Thus it is of particular advantage to have a simple chromatic data display system that is adaptable to all existing rectilinear scanners without extensive structural or electronic modification as well as having the capabilities of being easily incorporated into new scanners and that provides all scans in full size and in color for ease of interpretation and which system and apparatus operates either from information obtained directly from the patient or in a rescan mode from existing photoscans or camera images obtained on X-ray or on other types of film.

SUMMARY OF THE INVENTION

It is well known that a human patient given radioactive material, such as radio isotopes, passes this radioactive material through the blood system with the radioactive material lodging in growths and in the body organs. Known radio isotope rectilinear scanners employing known scintillation detectors converts the gamma radiation from the radio isotopes to an image on an X-ray film or black and white camera film. The film image provides a physical record of the intensity of the radioactive material, and thus allows knowledgable persons to establish locations of tumers, growths and the like and make other diagnosis.

The chromatic data display system of this invention is in one form, an accessory for the known radio isotope rectilinear scanners and produces the scan records in color. A count rate signal, developed from the scintillation detector output, is divided into isocount levels with each level energizing a given color light beam that exposes color photographic paper. The multi color light source is made to follow the scan motion of the scanning mechanism in the known rectilinear scanner through mechanical interconnection with the scanning mechanism. Thus a full size scan record in color is produced with each color indicating a precisely defined isocount range.

The multi color light source glides on a bearing surface and produces the appropriate color beam for exposing the color photographic paper, in a light tight box. Magnetic coupling is employed to interconnect the multi color light source through the wall of the light tight box to the scanning motion of the scanner mechanism. Thus the light source is moved in the light tight box without an opening required and only light force is necessary to move the light source because of its light weight and the low friction supporting surface. The signal input for the light controlling circuits is taken from the rate meter or other output of the known radio isotope, rectilinear scanner electronics. The count rate signal is electrically coupled to an operational amplifier that produces the required amplification and base line adjustments. Level detectors respond to the output of the operational amplifier and function to trigger switches that energize high speeds miniature lights within the moving multi color light source. Each light has a corresponding color filter to produce the desired color. So no moving parts are involved except for the scan motion of the scanning mechanism and the multi-color light assembly.

A unique light collimator is used to direct the light beams and project the desired spot size beam onto the photo sensitive color paper. As the scintillation detector signal ranges between the minimum and maximum count rate, the level detectors turn on predetermined ones of the lights to sequence through, for example, six colors comprising violet, blue, green, yellow, red and magenta. Combinations of two or more colors from two or more lights energized simultaneously can and have been used to produce an additional color or colors. The seventh color can be white, which corresponds to the lowest count rate level and is obtained with all lights off. Means are provided for adjusting the count rate range to place the range within the range of the aforesaid colors and to selectively adjust the count level for each color as for example, to energize the violet color with a minimum count and the magenta color with a maximum count. Means are also provided to adjust the response of the level detectors to provide linear, logarithm and inverse logarithm steps in the color range from violet to magenta.

While the chromatic data display system in one embodiment functions as an accessory for existing radio isotope rectilinear scanners, the chromatic data display system in another embodiment functions with the scanner mechanism to reproduce existing black and white scan records in color. A light sensitive cell is directly connected to the scan mechanism and is moved in a rectilinear motion to retrace a black and white photoscan image on X-ray or camera film that is illuminated by a view box. The pulse rate signal developed by the light sensitive cell is coupled through the operational amplifier and level detectors to selectively illuminate the various lamps. The chromatic data display system produces the existing black and white photoscan in a color record in which the intensities of the gray and black portions in the black and white photoscan are converted into varying color representations that are more easily discernible in making a diagnosis. As in an original scan, the amplifier and linearity controls of the chromatic data display system allow areas of particular interest in the black and white photoscan to be converted into selective color isocount levels that provide selective color arrangements. The photo cell sensitivity and amplifier gain are such that even small variations in the image on the existing photoscan can be expanded into several color regions. Further, effective background suppression can be obtained simply by increasing the trigger level of the first color. Still further, black and white photoscans that are difficult to interpret can be rescanned several times using different color level settings to provide additional information to assist in the diagnosis. It is to be understood that the term varying signal information includes "varying pulse rate information", "pulse information" and "rate of pulse information" developed directly from a scintillation detector output, or analog signals developed by the light sensitive cell in a rescan mode of recanning any type of black and white negative. It is also to be understood that the invention can be responsive to any varying signal information in the form of sensor signals or analogue signals, to provide a desired recorded chromatic display.

It is therefore an object of this invention to provide a new and improved chromatic data display system for use with new and existing radio isotope rectilinear scanners.

It is another object of this invention to provide a new and improved chromatic data display system that produces scan records in color from existing black and white photo scans of radioactive material distribution in parts of human patients.

It is another object of this invention to provide a new and improved chromatic data display system that produces scan records of radioactive material distribution in contrasting colors, which colors reflect different levels of gamma radiation.

It is another object of this invention to provide a new and improved chromatic data display system that provides improved scan records of radio isotope distribution and allows physicians and other knowledgable persons to make improved and more meaningful diagnosis from such records.

It is another object of this invention to provide a new and improved chromatic data display system that in a single unit provides means for producing scan records in color from information obtained directly from a scanned patient or from existing black and white photoscan records.

It is another object of this invention to provide a new and improved chromatic data display system that may be employed as an accessory for existing radio isotope rectilinear scanners and which accessory produces scan records in color.

It is another object of this invention to provide a new and improved chromatic data display system for producing scan records in color wherein the color ranges relative to gamma ray intensity may be selectively adjusted to facilitate the production of greater contrast displays.

Other objects and many advantages of this invention will become more apparent upon a reading of the following detailed description and an examination of the drawings wherein like reference numerals designate like parts throughout and in which.

Figure 1:
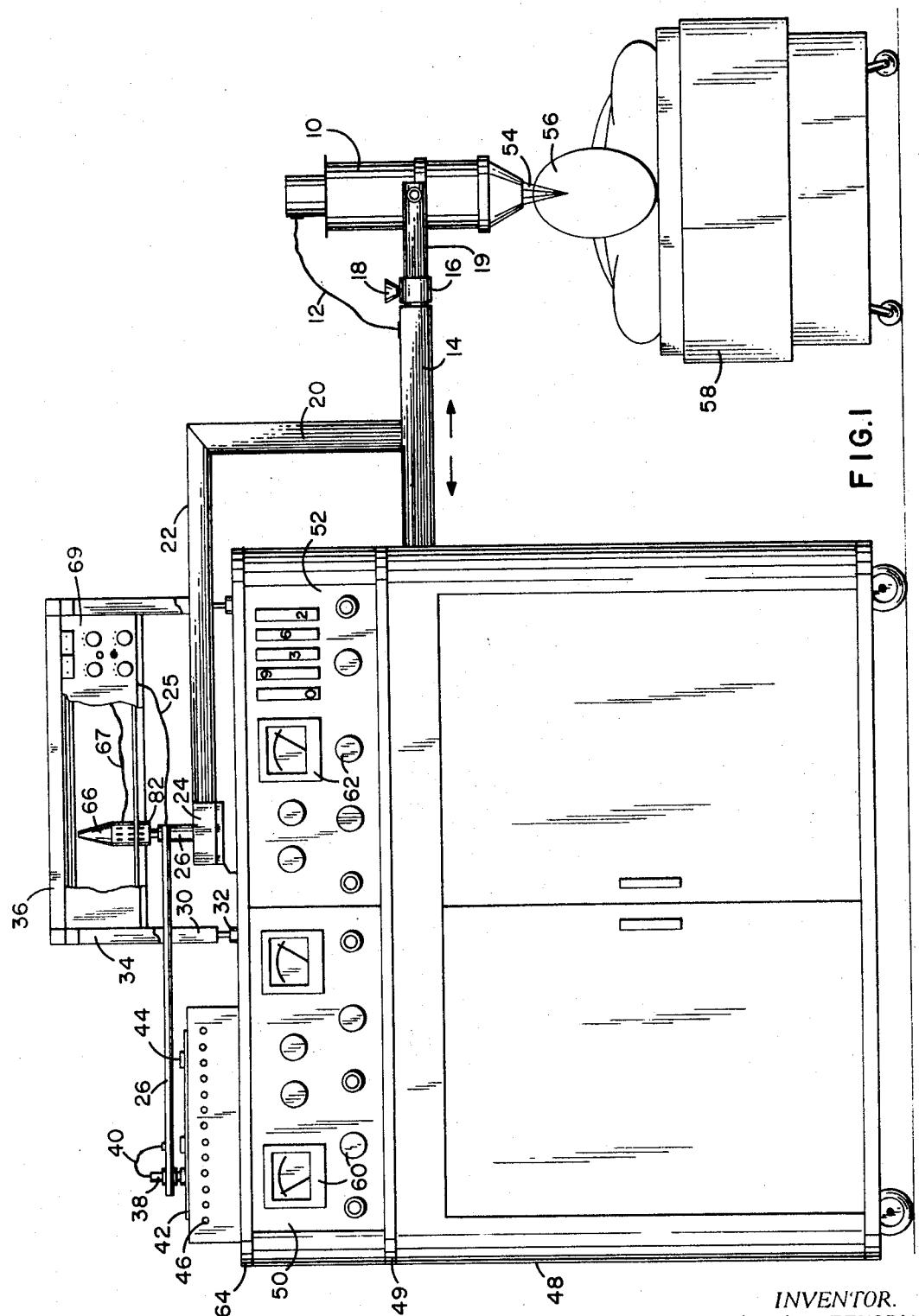
FIG. 1 is a side elevation view, with parts broken away, of the chromatic data display system mounted on a radio isotope rectilinear scanner.

Referring now to FIG. 1, there is illustrated an existing radio isotope rectilinear scanner with the chromatic data display system coordinated therewith. The existing radio isotope rectilinear scanner has a cabinet 48 with an arm 14 projecting from the side thereof. The arm supports a known scintillation detector device 10 for pivoting movement in U-shaped bracket 19 that may be selectively positioned relative to a patient 56 by a telescoping member 16 and adjusting screw 18. The patient 56 is resting on a normal support 58, which patient 56 has been given radioactive material, as for example radio isotopes, that have been carried by the blood system into the patient's head. The scintillation detector 10 generally comprises a photomultiplier with a scintillating crystal. The crystal experiences glow spots when contacted by gamma rays. The gamma rays are radiated from the radio isotope in the patient 56. The gamma ray radiations 54 pass through a collimator in the scintillation detector 10 to the crystals. The crystal energizes the photomultiplier and the photomultiplier produces pulse information in the form of electrical pulses through conductor line circuits 12 that are carried in the internal volume of the tubular arm support 14, 20, 22 and 26.

Figure 2:
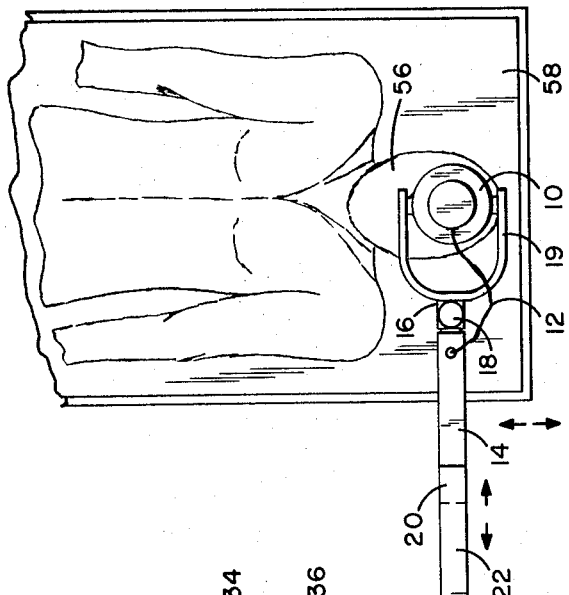
FIG. 2 is a top view with parts in phantom of the chromatic data display system and the radio isotope rectilinear scanner illustrated in FIG. 1.

A known mechanism in the cabinet 48 provides rectilinear motion to the arm 14 in the direction of the arrows illustrated in FIGS. 1 and 2. In normal operation, the arm 14 is moved in a systematic and linear movement to scan the head portion or other desired portion of the patient 56. Electronic circuits for operating the radio isotope rectilinear scanner are normally positioned in cabinet portions 50 and 52, that rest on the upper table support 49 and have controls and meters 60 and 62 for their controlled operation. The radio isotope rectilinear scanner is a well known structure that is made by several companies, as for example Nuclear-Chicago Corporation of 33 East Howard Avenue, Des Plaines, Illinois.

The chromatic data display system comprises a light tight, enclosed housing 34 that is supported by legs 30 on the upper surface 64 of the cabinet 48. Known screw adjusting levelers 32 adjust the height of the light tight box 34 from the surface support 64 and the arm 22. Connecting arms 20 and 22 are secured, such as by welding or the like, to the movable arm 14. End 24 supports a hollow conduit 26 that in turn supports a magnetic positioner 82 (see FIG. 4). The magnetic positioner 82 comprises a magnet having six spaced poles 82 that project upwardly around a hollow center opening through which a connecting screw 86 projects down into the tube portion 26 with a threaded end 87 that secures the magnet positioner 82 to the tube member 26. The openings 84 between the pole members 82 define the structure of the pole members 82.

Figure 6:
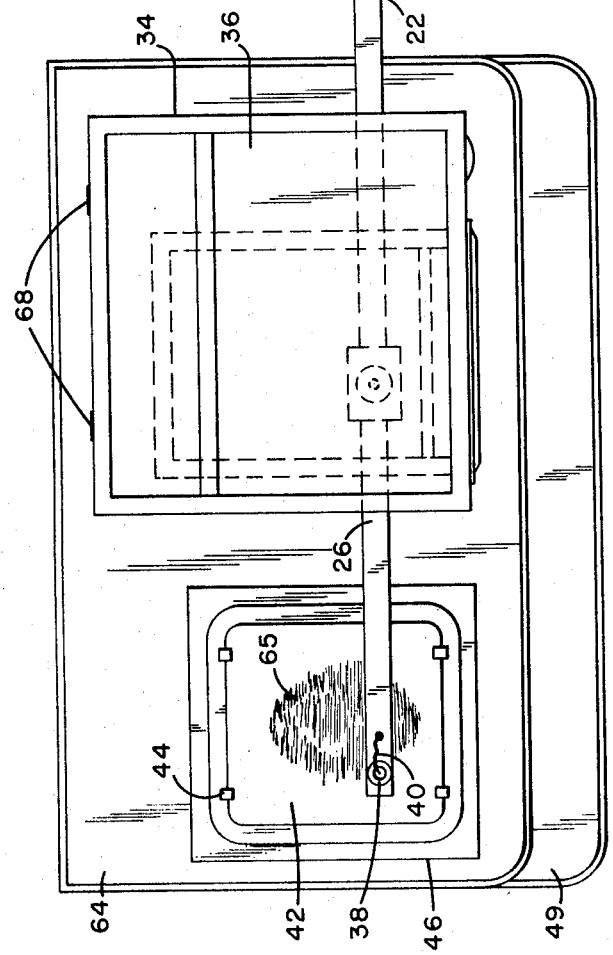
FIG. 6 is a cross sectional view taken along lines 6—6 of FIG. 4.
Figure 6:
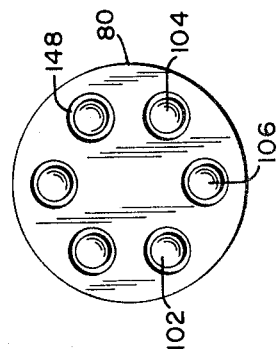
Figure 5:
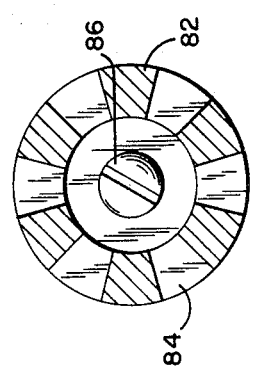
FIG. 5 is a cross sectional view taken along lines 5—5 of FIG. 4.
Figure 4:
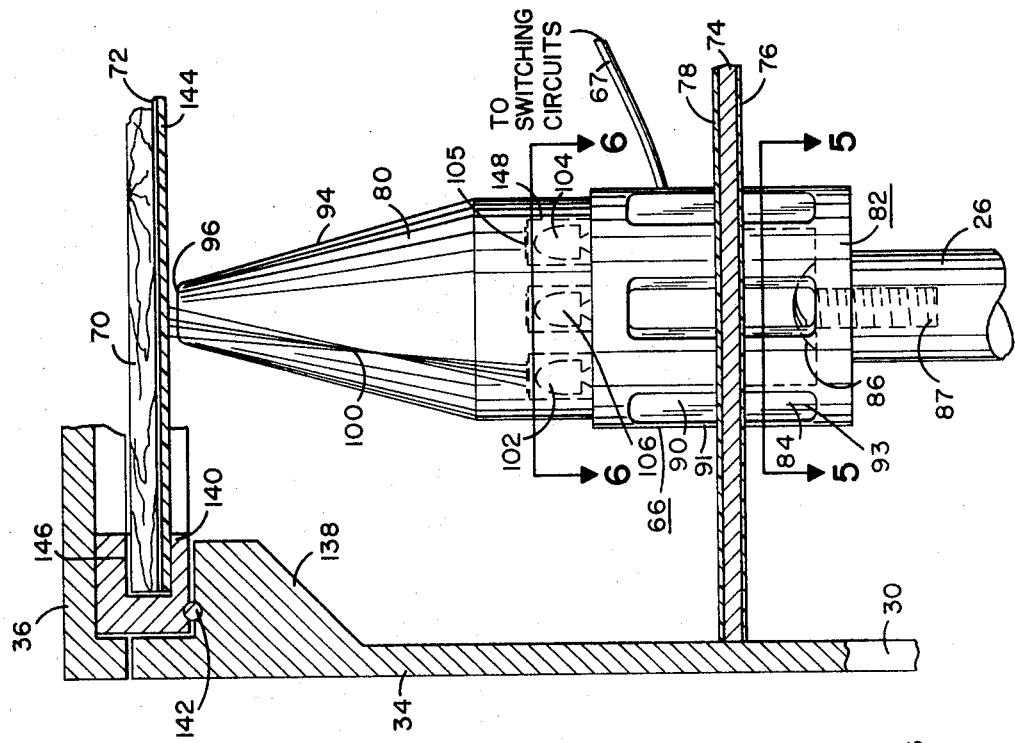
FIG. 4 is A side view with parts in section and parts broken away of the multi-color light source.

The upper surface of the magnetic unit 82 normally rests against the lower surface of an aluminum plate 74 that has bearing surfaces 76 and 78 on each side thereof. These bearing surfaces may be made of any suitable non-magnetic, low friction material, such as plastic and preferably teflon. Riding on the upper surface of plate 74 on the, for example teflon surface 78, is the multi-color light source 66 that comprises a lower six pole magnetic unit 91 having openings 90 therethrough that provide a pole structure that is the same as the structure of the magnetic positioner 82. The upper portion of the magnetic portion 91 has a cylinderical recessed end that receives and supports a light collimator structure 80 that may comprise a plastic light collimator made of Lucite or other suitable materials. A plurality of openings 148, see FIG. 6, in the bottom surface projects into the base of the light collimator 80 for positioning a plurality of quick acting white light bulbs 102, 104, and 106. Positioned against the upper surface of these openings 148 are a plurality of color lens 105, which lenses convert the white light into appropriate colored illuminations which illuminations pass in the light ray column, generally illustrated by lines 100, through the conical portion 94 to the output end 96. The light beam contacts the film 72 in the form of a small spot. Line conductors 67 carry the appropriate switching currents to the lamps and are connected to the lamps through appropriate socket connections that are illustrated in more detail in FIG. 7. It is to be noted that while six openings 148 and lamps 102, 104 and 106 are illustrated in FIGS. 4 and 6, any appropriate number of lamps may be used so long as the light coordination is obtained.

The magnetic attraction between the magnetic units 82 and 91, causes the relatively light weight multi-color light source 66 to follow the movement of the arm 22. The sliding movement of the two respective members on the telfon surface does not retard the movement of the multi-color light source 66 relative to the moving tube member 26. The screw connection 86 and 87 is adjusted as necessary to place the magnetic positioner 82 substantially against the plate 74. Also screw adjustment members 32 may be similarly employed.

The light tight box 34 has side portions that may be made of aluminum or other suitable material with an upper inwardly projecting portion 138 that forms a shoulder for supporting a longitudinal film support 140 having a slot 146 therein. An O-ring 142 or other suitable sealing member provides a light seal between the members 138 and 140. The lid portion 36 of the light tight box 34 pivots on known hinge members 68, see FIG. 2, to open the cavity of the light tight box for insertion of the film 72. A film holder 70, that may be made of suitable material, is positioned in the slot 146 with the film 72 inserted thereunder and a tranSparent member 144, that may be made of plastic or glass, forms a lower support for the film 72. Thus the light rays 100 pass through the transparent portion 144 and in the darkened enclosure of the light tight box 34 exposes the film 72 with color light spots.

In operation of the structure described thus far, the arm 14 is moved by the known mechanism in cabinet 48 in rectilinear movement with the scintillation detector 10 generating output pulse information that is fed through lines 12 to the circuits 50 and 52 and back through the hollow portion of the arm 14, through the hollow arms 20 and 22 and through tube 26 and line circuits 25 to the chromatic data display system circuits 69 that are positioned in the forward portion of the light tight box 34, with appropriate controls and meters. Lines 67 carries the switching currents to the lamps 102, 104 and 106 to provide a coordinated color display on the color film 72. The circuits for the chromatic data display system are illustrated in FIG. 8 and will be explained in more detail hereinafter.

Figure 3:
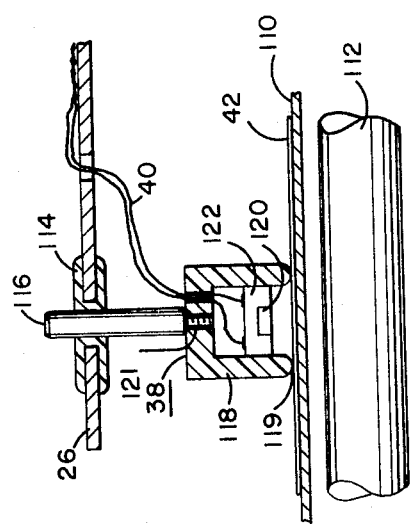
FIG. 3 is a side view with parts in section of a light sensitive cell mounted on a white photoscan illuminated view box.

The structure and operation described thus far provides a direct scan record in color of information obtained from a direct scanning of the patient 56. As previously stated the chromatic data display system also provides scan records in color from pre-existing black and white scan records. To accomplish this, a light box 46 having air passages through the sides thereof is supported on the plate 64. The light box 46 has a transparent member 110 that may be made of plastic, glass or other suitable material, that is illuminated in the known manner by, for example, a florescent tube 112 (see FIG. 3). To produce the black and white scan record in color, a black and white scan record film 42 having a black and white image 65, see FIG. 2, representing radio isotope distribution is placed on the transparent member 110 and held by clips 44. A light sensitive cell unit 38 rests on the film surface 42 and is moved by arm 26. The light sensitive cell unit 38 has a cylindrical housing 118, that may be made of teflon or other suitable material, with a known light responsive cell supported therein in spaced relationship from the film 42. THe light cell comprises a known light sensitive cell construction having photoconductor material 120 that is positioned in a conductor body 122 that passes current pulses to lines 40. The structure (see FIG. 3) of the open end of cylindrical housing 118 restricts the light to the light cell, to that portion of the film 42 enclosed by end 119 of the cylindrical portion 118. The cylindrical portion is connected by a known screw thread connection 121 to a rod 116 that passes through a guide washer 114 that may be made of teflon or other suitable bearing material. This latter structure allows the light sensitive cell to move vertically in a reduced friction connection and to press against the film surface 42 in a light yet positive manner. The line conductors 40 carry the pulse information from the light sensitive cell 38 through the cable 25 to the control circuits where the pulse information is processed to supply appropriate color light switching currents through cable 67 to the multi-color light source 66. The rectilinear scanning motion of the arm 114 provides the rectilinear scanning motion to arm 26 to move the light sensitive cell unit 38 in a scan over the black and white film 42.

Figure 8:
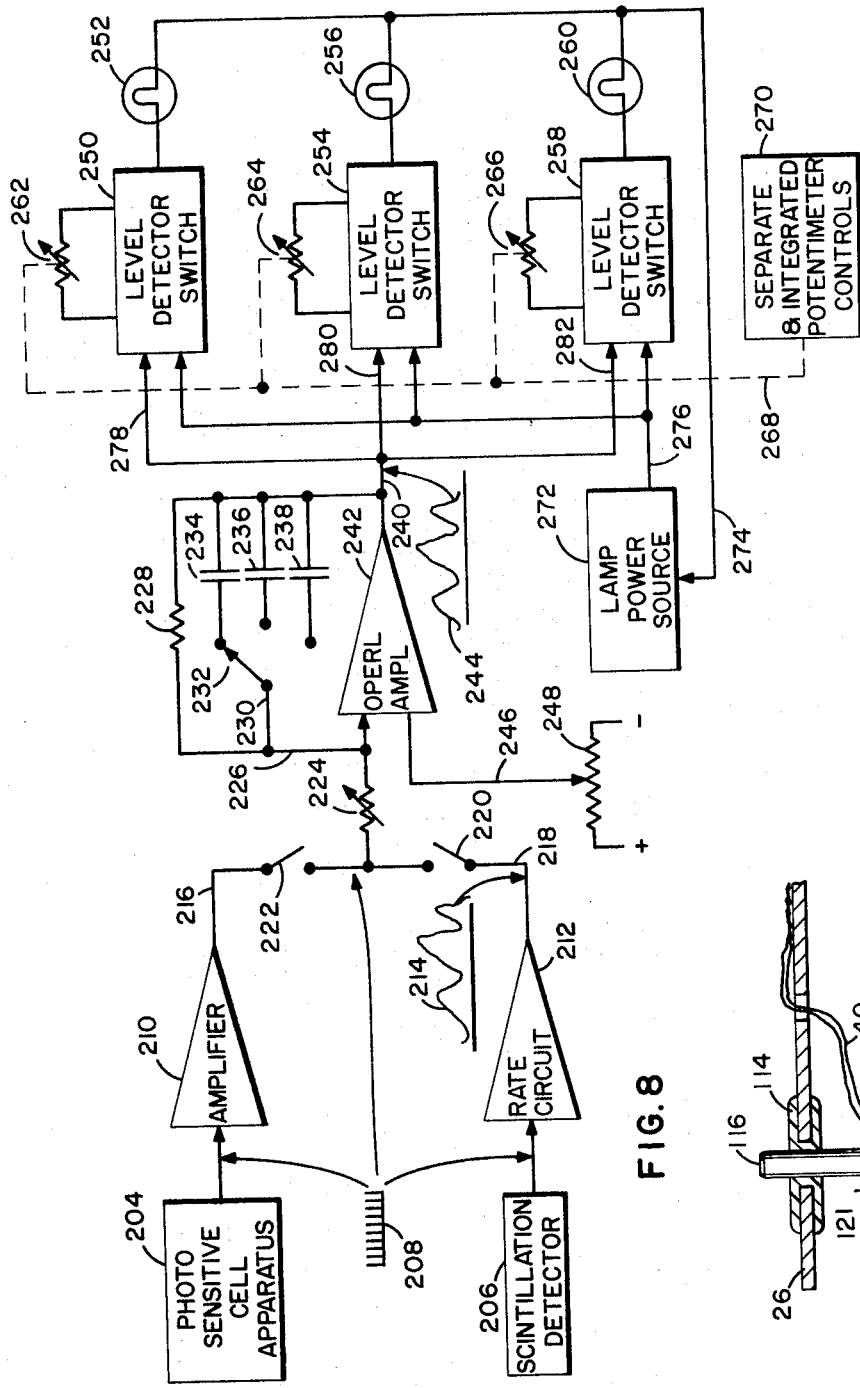
FIG. 8 is a block and schematic diagram of the electrical circuit employed in the chromatic data display system.

Referring to the circuit illustrated in FIG. 8, the mode of employing the scintillation detector 10, the scintillation detector circuit 206 that corresponds to the known scintillation detector 10, feeds a plurality of pulses 208, through for example line 12 of FIG. 1, to a rate circuit 212. The pulses 208, as illustrated, have a varying pulse rate relative to time that is proportional to the detected gamma radiation received from the patient 56. The rate detector 212 is a known integrator circuit that converts the pulse information 208 into an analog DC current waveform, the shape of which has an amplitude variation proportional to the pulse rate and may generally have the shape of waveform 214. In this mode, switch 220 is closed and the signal waveform 214 in line 218 is fed through variable potentiometer 224 and through the operational amplifier circuit 242 to the output line 240. The operational amplifier 242 is a known precision amplifier that is positioned in an overall composite circuit having a level control 248. A gain control potentiometer 224 and time constant control comprising capacitor circuits 234, 236, and 238 that are interchangeably switched into the circuit by switch 232. Resistor 228 functions as a feedback resistance.

The output of the operational amplifier circuit is a direct current waveform signal 244 in line 240 that is fed through lines 278, 280 and 282 to the respective level detector switches 250, 254 and 258. The level detector switches may comprise, for example, differential amplifiers, comparators, or employ other known circuit techniques in which each level detector switch is responsive to a given magnitude range of the input waveform 244 for switching lamp voltage to its respective lamp circuit 252, 256, and 260 for a given analog bracket of the waveform 244. A lamp power source 272 provides lamp voltage through lines 276 and 274. While only three level detector switches and three lamps are illustrated in FIG. 8, it should be understood that there is a level detector switch for each lamp and for example, six lamps are illustrated as being used in FIG. 4. Thus six level detector switches would be used to energize the six lamps.

In the rescan mode, the photosensitive cell 38 provides an output signal in response to rectilinear movement of the cell 38 over the image on the film 42. In response to varying illumination of the photosensitive cell, the known photosensitive cell circuit 204 of FIG. 8 provides an output signal in an analogue form 208 to an amplifier 210. The amplifier 210 amplifies this information and provides an output signal through line 216 and through closed switch 222 to the operational amplifier circuit 242, previously described. The operational amplifier 242 and the level detector switches 250, 254 and 258 function to illuminate the respective lamps 252, 256 and 260 in the manner previously described.

In further operation, the pulse rate information 208 detected or generated by either the scintillation detector 206 or the photosensitive cell apparatus 204, may vary widely in pulse rate because of wide variations in radioactive material concentration in the scanned subject or for other reasons. Accordingly the waveform 214 or the pulse rate information to the operational amplifier 242, may not always be within scale relative to the set analog bracket level of the respective level detector switches. The gain control 224 functions by changing the potentiometer setting to expand or contract the magnitude level range of the pulse information or the waveform 214 to the operational amplifier circuit. Thus the input signal may be expanded or contracted to provide an output waveform 224 having magnitude swings that cover the analog brackets of all the level detector switches. To reduce lower level interference, the level control potentiometer 248 sets the lower operational range of the operational amplifier and thus functions as a background suppression control by removing lower portions of the waveform.

The rate circuit 212 in the scintillation detector mode functions as previously described to provide a direct current analog waveform 214 having magnitude swings corresponding to the pulse-rate of signal 208. In the photosensitive cell mode, the operational amplifier circuit 242 functions as a rate circuit for providing the output waveform 244 having magnitude swings that correspond to the pulse rate information 208 in line 216. Accordingly in the scintillation detector mode both the rate circuit 212 and the operational amplifier 242 function to convert the input pulse information into the output waveform 244, while in the rescan mode only the operational amplifier 242 functions as a rate circuit conversion unit.

It is a feature of this invention that the time constant of the operational amplifier circuit is optimized to obtain all the pulse rate information 208 in the output waveform 244 and to permit fast scan speeds without the occurrance of scalping of the pulse rate information in the output waveform 244. Thus the capacitors 234, 236 and 238 are selectively inserted into the feedback loop of the operational amplifier 242 by switch 232 to provide the operational amplifier circuit with an optimum time constant to obtain the desired smooth waveform 244 that is precise to the pulse rate information of pulses 208. This operational amplifier time constant control compliments the more rough conversion of the rate circuit 212 in the scintillation detector mode.

Figure 9:
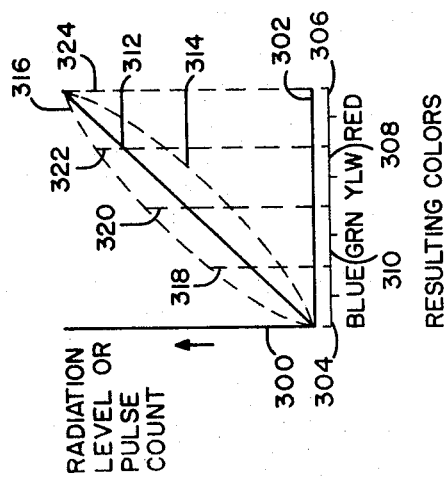
FIG. 9 is a graphical illustration of the relation between the radiation level or pulse counts and the resulting colors in the color scan record.

It is often advantageous to vary the radiation level or pulse count range that will illuminate different light displays. This aids in optimizing the information obtained from existing photoscans and also permit flexibility where using different isotopes in an examination that gives off different energy levels. Accordingly a potentiometer control is provided for each level detector switch and functions in the known manner to change the bias on the level detector switches and thereby change the analog bracket level settings of each of the level detector switches. As illustrated in FIG. 8, variable potentiometers 262, 264 and 266 are provided for each level detector switch 250, 254 and 258. A known linkage control 268 interconnects the respective potentiometers to a separate and integrated potentiometer control 270 that allows the individual potentiometers 262, 264 and 266 to be varied individually or in a predetermined combination. As illustrated in FIG. 9, the potentiometer settings of the respective potentiometers, as for example potentiometers 262, 264 and 266, may be controlled by linkage 268 from the potentiometer controls 270 to provide pre-determined color versus radiation level or pulse count ratios, as for example a linear relationship 312, a logarithmic relationship 316, and an inverse logarithmic relationship 314. It is to be noted that in the linear curve 312, the range of pulse count rate for illuminating each lamp are equal. In the logarithm curve 316 a larger pulse rate range illuminates the blue light than illuminates the red light. Whereas in the inverse logarithm curve 314, a larger pulse rate range illuminates the red lamp than illuminates the blue lamp. Known switching networks, in place of potentiometers, can and have also been used for the above purpose.

OPERATION

The scan motion for the chromatic data display system is obtained from the scanner arm 14 by means of the mechanical connection 20 to the scanner arm 14. A small multi-color light source or head 66 glides on bearing surfaces and produces the illumination within the light tight box 36. A magnetic coupling between the head portion 66 and the lower portion 182 interconnects the light source 66 to the scanning motion. Very little force is required to move the light source because of its light weight and low friction surfaces. The input signal for the light source energizing means is taken from the rate circuit output of the scanner electronics of the scintillation detector apparatus. The count rate signal is electrically coupled to the operational amplifier circuit 242, that provides the required amplification and base line adjustments. Level detector switches at the output of the operational amplifier 242 energize high speed miniature lamps within the moving multi-color light source head 66. Each lamp is associated with a corresponding color filter 105 to produce the desired color beam. The light collimator 94 produces the desired spot size from the multi-color light sources and projects the spot on photosensitive color paper. A suitable color paper may be the standard color sensitive paper made by Eastman Kodak Company or other suitable color sensitive papers. As the scintillation signal or pulse rate information goes from minimum to maximum count rate, the level detector switches, switch the lamps in sequence through, for example, the six colors of violet, blue, green, yellow, red and magenta.

In the other mode of operation, a light sensitive cell 38 is connected to the rectilinear scanning arm 26 and is made to trace a black and white photoscan 42 that is illuminated by the view box 46. The resulting pulse rate signal 208 is coupled through the operational amplifier 242, and level detector switches 250, 254 and 258 contool the light illumination in the multi-color light source 66. As in an original scan, the operational amplifier 242 and the potentiometer controls 270 allow areas of particular interest to be converted into color isocount levels. The photo cell sensitivity of the light cell 38 and operational amplifier gain are such that even small variations in photoscan image density can be expanded into several color regions on the color display. Effective background suppression is obtained by the level control 248. The light detector cell may comprise any suitable photo sensitive cell such as photosensitive cells made by the Clarex Corporation.

MODIFICATION

It is to be noted in reference to FIG. 1, that the color paper 72 is exposed by the color light beam 100 on its underneath side, which gives a reverse image to the rectilinear movement of the scintillation detector 10. It is within applicants' invention to reverse the structure in the light tight box 34 to place arm 22 above the light tight box 34 and the bearing plate 74 at the top rather than at the bottom of the box 34 so that the position of the light source 66 is reversed giving a direct image recording of the rectilinear scan of the scintillation detector 10 or the light cell 38.

Figure 7:
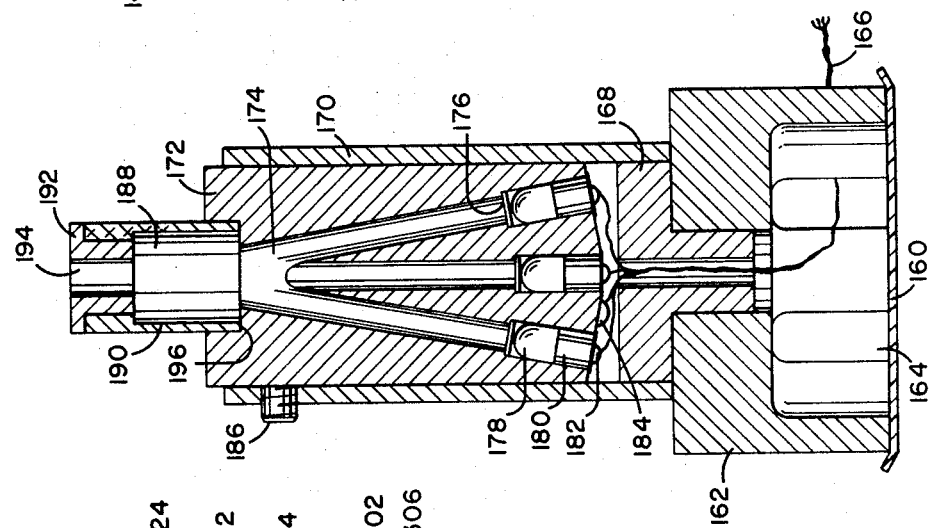
FIG. 7 is a cross sectional view of a modified embodiment of the multi-color light source.

In another embodiment, the multi-color light source head 66 is replaced by the modified head illustrated in FIG. 7, that is capable of projecting more intense light onto the color paper 72. This more intense color light output allows the color paper 72 to be reversed and be exposed from the reverse side. The light head illustrated in FIG. 7 comprises a magnetic pole unit 162 having openings 164 that define the same six-sided pole structure as previously described relative to the head 66. Mounted on the pole structure 162 is a cylinderical member 168 having a centered aperture for receiving the cable 166 that carries line currents to the lamps 178 that are positioned in sockets 180 in the cylindrical member 172. The cylindrical member 172 has tubular channels 174 cut therein, which tubular channels intersect at the end of the light fibers 188. A housing 190 rests on shoulder 196 to hold the light fibers or pipes 188 in position and a cylindrical cap member 192 is secured in the end of the tubular adapter 190 and has an aperture 194 for passing light from the light pipes 188 to the color paper with a given spot size. Lens 176 focuses as necessary the light of the respective lamps 178 onto the lower surface of the bundle of light pipes 188 and also provides the appropriate color for the white lamps 178. A screw means 186 allows vertical positioning of the member 172 in the cylindrical housing 170. Members 168, 170, 172, 190, and 192 may all be constructed of aluminum or other suitable materials. The lower plate member 160 may be made of teflon or of other suitable non-magnetic material.

OPERATION OF THE MODIFIED EMBODIMENT

The light head of FIG. 7 is connected by cable 166 to the cable 67 wherein the lamps are illuminated in the same manner as previously described. In other respects the light head of FIG. 7 operates in the same manner as light head 66 with the exception that the light head in FIG. 7 is capable of providing a more brillant light output through aperture 194.

Having described our invention, we now claim:

1. Apparatus for providing recorded chromatic data displays of varying signal information on color film comprising,
   a multi-color light source means for selectively projecting light beams of individual colors on the color film,
   means for moving said light source means in a given pattern over the color film,
   means responsive to the varying signal information for energizing said color light source to project individual colored light beams for given ranges of the varying signal information,
   said multi-color light source means comprising a light head with a plurality of individual lamps arranged therein in a circle at one end thereof,
   light collimating means for directing the light beam from each of said lamps to a given point at the other end of said head,
   a light tight container for holding the color film,
   said container having a flat wall with non-magnetic bearing surfaces on the upper and lower surfaces of said wall,
   said one end of said head having magnetic material at said one end,
   said one end being slidable on the one of said bearing surfaces adjacent the color film,
   a second head with magnetic material connected to said moving means and slidable on the other of said bearing surfaces,
   and whereby said first and second heads become magnetically attracted and movement of said second head causes a corresponding movement of said first head.

2. A chromatic data display apparatus as claimed in claim 1 for use with means having a rectilinear scanning mechanism that detects the distribution of radioactive material in a body by rectilinearly scanning the body with a detector that provides pulse information proportional to the radioactive material distribution in which,
   said moving means being connectable to the rectilinear scanning mechanism,
   and said energizing means being electrically connected to the detector.

3. Apparatus for providing recorded chromatic data displays of varying signal information on color film comprising,
   a multi-color light source means for selectively projecting light beams of individual color on the color film,
   means for moving said light source means in a given pattern over the color film,
   means responsive to the varying signal information for continuously energizing said color light source means to project individual colored light beams for given rate ranges of the varying signal information,
   means for illuminating a black and white image on a developed film,
   a light sensitive cell for providing signal information output proportional to the intensity of detected light,
   said light sensitive cell being movable over said illuminated film by said moving means in said given pattern,
   and said energizing means being electrically connected to said light sensitive cell.

4. A chromatic data display apparatus as claimed in claim 3 for use with means having a rectilinear scanning mechanism in which,
   said moving means being connectable to the rectilinear scanning mechanism.

5. Apparatus for providing recorded chromatic data displays of varying signal information on color film or paper comprising,
   a multi-color light source means for selectively projecting light beams of individual colors on the color film,
   meanS for moving said light source means in a given pattern over the color film,
   means responsive to the varying signal information for energizing said color light source to project individual colored light beams for given ranges of the varying signal information,
   means for illuminating a black and white image on a developed film,
   a light sensitive cell for providing varying signal information output proportional to the intensity of detected light,
   said light sensitive cell being movable over said illuminated film by said moving means in said given pattern,
   said energizing means being electrically connected to said light sensitive cell means having a rectilinear scanning mechanism,
   said moving means being connectable to the rectilinear scanning mechanism,
   said energizing means being electrically connected to the detector,
   said energizing means includes means for converting the pulse information to a direct current waveform signal having a magnitude that varies proportionally with the rate of the pulse information,
   and switch means responsive to given ranges of magnitude of said waveform signal and said varying signal for a given color light beam for a given range of magnitude of said signals.

* * * * *